Patented Oct. 25, 1932

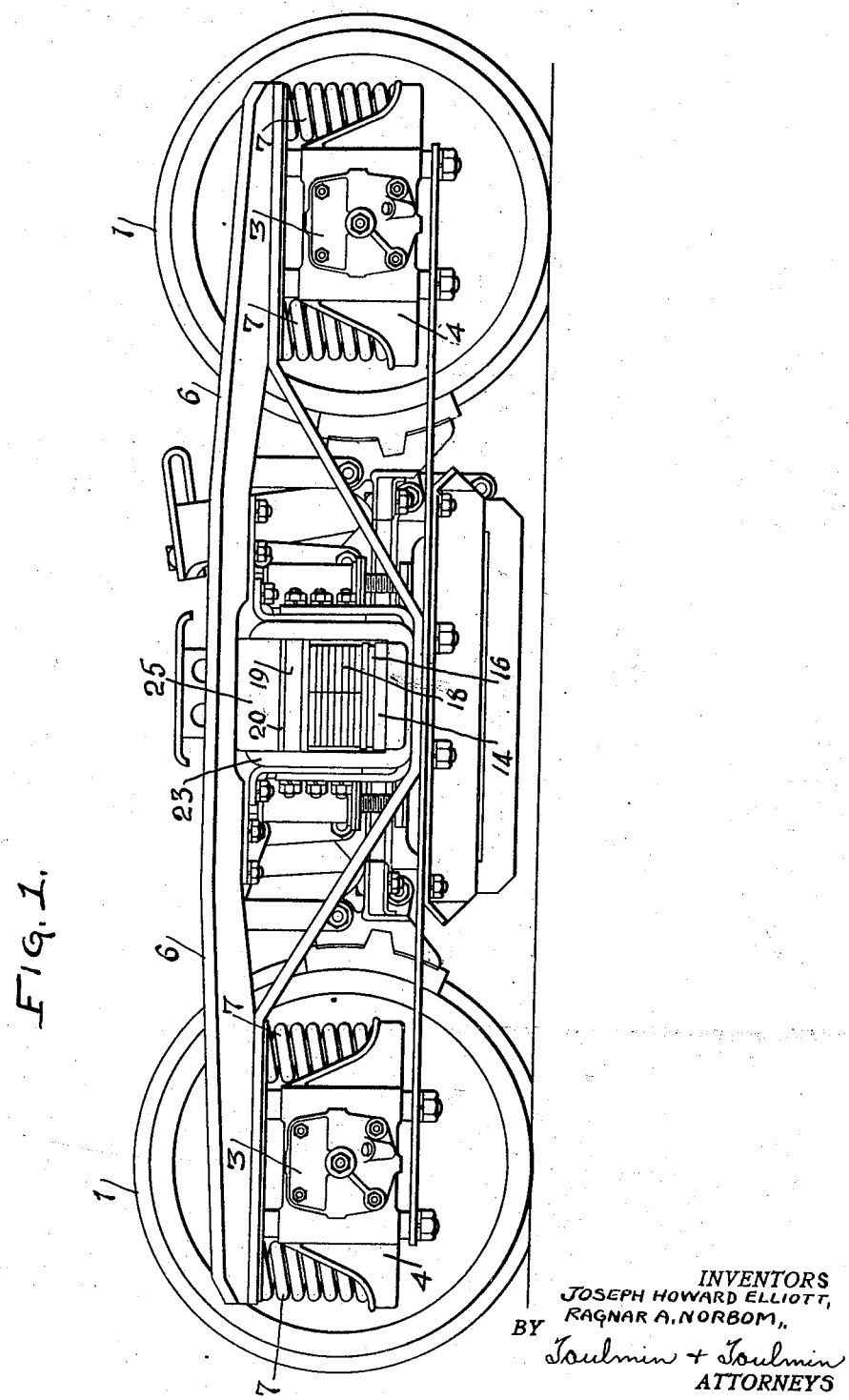

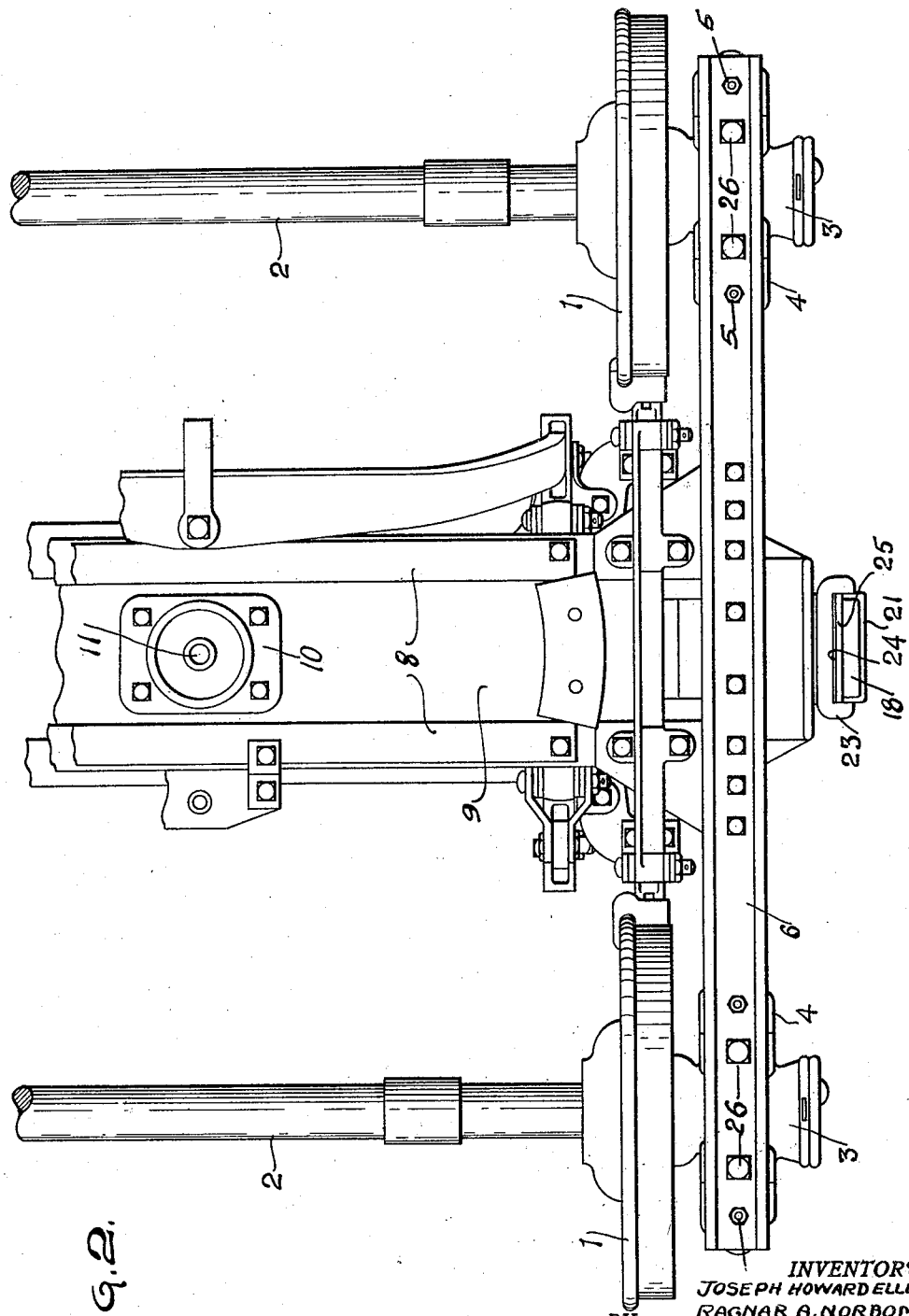

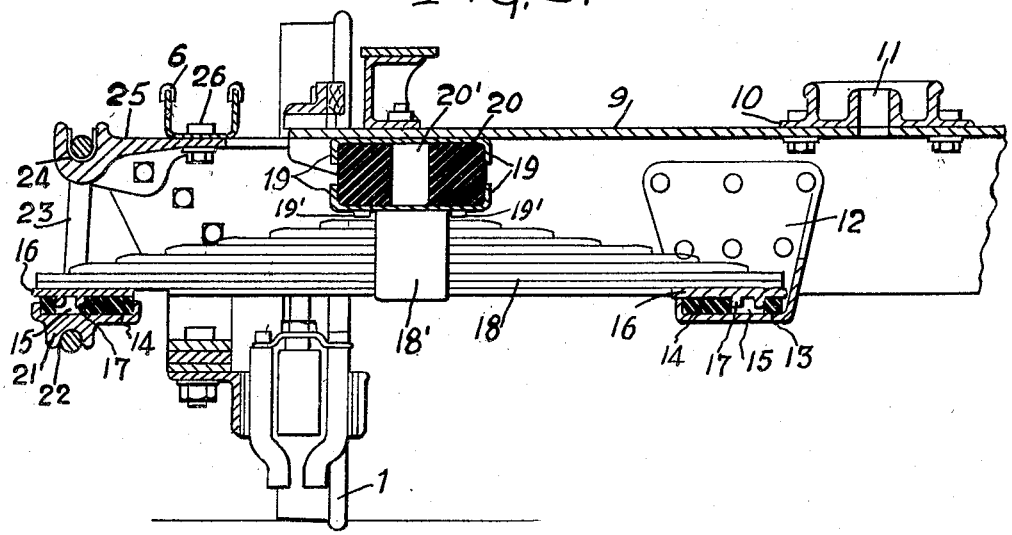

1,885,090

UNITED STATES PATENT OFFICE

JOSEPH H. ELLIOTT AND RAGNAR A. NORBOM, OF CINCINNATI, OHIO, ASSIGNORS TO THE CINCINNATI CAR CORP., OF CINCINNATI, OHIO, A CORPORATION OF OHIO

TRUCK FOR HIGH SPEED INTERURBAN CARS

Original application filed June 5, 1929, Serial No. 368,456. Divided and this application filed April 12, 1930. Serial No. 443,641.

This application is a division of copending application Serial Number 368,456, filed June 5, 1929.

It is the object of this invention to provide improved means of supporting the bolster on car trucks. It is more specifically the object of this invention to provide a cantilever leaf spring between the truck frame and the truck bolster so that the bolster will be supported primarily on the cantilever spring. There is one spring near each end of the bolster.

It is a further object of this invention to provide between the cantilever spring and the bolster one or more helical springs or rubber blocks to form a cushion between the cantilever springs and the bolster. These helical springs or rubber blocks ride on the cantilever semi-elliptic leaf springs. Thus there is combined the spring connections of the cantilever springs and the helical springs or rubber blocks to provide a smoother support for the car and a support that is less likely to transfer to the car jolts and jars produced in the truck.

This arrangement of long-highly flexible and smooth-acting cantilever springs, to which is added the helical springs or rubber blocks, is to iron out or absorb the minor vibrations which pass through the cantilever springs without causing the springs to vibrate because of the friction due to the contact of the leaves with each other.

These and other advantages will appear from the description taken in connection with the drawings.

Referring to the drawings:

Figure 1 is a side elevation of a complete truck.

Figure 2 is a plan view thereof.

Figure 3 is a section on the line 3—3 of Figure 1.

The numeral 1 is used to designate the wheel of a truck in which the axle is indicated by the numeral 2. The truck is composed of two axles with wheels on each end thereof connected by a frame in the manner ordinarily found in street cars and railway cars.

The numeral 3 is used to designate a journal box, which engages and fits over the outer ends of the axles. The numeral 4 is used to designate journal brackets which are held in relation to the truck frame 6 by means of bolts 5. The parts are so constructed that the frame may move up and down while being supported by the journal box.

For the purpose of allowing the up and down spring movement of the frames there are springs 7 located between the frame and the journal brackets. Connecting the frame members on each end of the truck there are transom members 8. There are two of these transom members for each truck, between which is located a bolster 9. This invention particularly relates to the means by which this bolster is supported on the frames of the truck. The bolster 9 is the transverse car support.

At the center of the bolster there is a bearing plate 10, which has a king pin socket 11 therein. Near the center and extending from the lower part of the bolster are two bracket members 12. These brackets are so constructed as to form a bench or seat in which one end of a spring rests and is supported. The spring seat is in the shape of a trough and is indicated by the numeral 13. In this spring seat is a packing 14 of some resilient material, such as rubber, which has a hole 15 therein.

On the under side of the cantilever spring 18 there is a plate 16 which has a lug 17 thereon adapted to fit into the hole 15. The cantilever spring is built up of different leaves and is in the shape of an ordinary leaf spring with the exception that the leaves are substantially straight. The plate 16 may be of any suitable material and attached to the ends of the spring in such a way as to be affixed thereto so that the spring is permanently held in the bracket. The central part of the spring is surrounded by a cuff member 18', which not only serves the purpose of holding the spring parts together but also serves the purpose of holding the spring in relation to a rubber block 20 mounted on the under side of the ends of the bolster by means of pin 20'.

For the purpose of providing a support and holding means for the rubber block or resilient member there is provided a casing 19. Within this casing there is a rubber block 20. While in Figure 3 this member is shown to be composed of rubber, or some similar material, it may be a spring or any means of resiliently forming a connection between the spring and the bolster. On the lower member of the casing 19 are two stop members 19', which engage opposite sides of the cuff member 18' to aid in holding the spring against longitudinal movement in relation to the bolster.

The numeral 21 is used to designate a bearing block, which has in the lower part thereof a circular seat 22 which receives therein the lower end of a link member 23. The link member 23 is supported at its upper end in a seat 24 of a bracket 25 which extends out from and is supported by the car truck frame by means of bolts 26. The link 23 is supported by the bracket 25 in such a way that it has transverse swinging movement in relation to the truck, thereby permitting the bolster to have a similar swinging movement in relation to the truck. This swinging movement of the bolster is not only effected by the pivotal connection of the link 23 with the bracket 25, but is also aided by the pivotal connection between the link 23 and the bearing block 21.

This bearing bock provides a seat similar to the seat found in the bracket 12 for supporting a packing member 14 similar to that found in the bracket. This packing member has a hole 15 which receives a lug 17 on a plate 16, similar to the plate on the other end of the spring and in engagement with the bracket. By means of these holes and lugs the ends of the spring are supported in such a way that the supports cannot move longitudinally of the spring.

It is obvious from an inspection of Figure 3 that the bolster 9 is entirely supported by means of the spring 18, which has one end thereof in engagement with and supported by the bracket 12, while the other end of the spring is supported by the link 23 resting in the seat 24 of the bracket 25 on the truck frame, the intermediate part of the spring engaging the resilient rubber block 20 on the end of the bolster so that the bolster is entirely supported by means of the link 23 on each side of the truck.

We desire to comprehend within our invention such modifications as may be clearly embraced within our claims and the scope of our invention.

Having thus fully described our invention, what we claim is new and desire to secure by Letters Patent, is:

1. In a car truck, a transverse member having a bracket attached thereto carrying shock-absorbing means, shock-absorbing means on the under side of said transverse member adjacent the end thereof, a spring having one end thereof supported by said bracket member upon said shock-absorbing means and its intermediate part engaging said shock absorbing means adjacent the end of said transverse member, and link means supported by said car truck supporting the other end of said spring.

2. In a car truck, a transverse member, a spring extending longitudinally to said transverse member, means on said transverse member to yieldingly support one end of said spring, swinging means on said car truck to yieldingly support the other end of said spring, and resilient means on the end of said transverse member engaging said spring intermediate the ends thereof whereby one end of said transverse member is supported by said car truck.

3. In a car truck, a transverse member, a bracket attached to said transverse member and providing a pocket, a resilient means mounted in said pocket having a hole therein, a spring having a lug thereon adapted to fit in said hole, resilient means between the central part of said spring and the end of said transverse member, and means on said car truck for resiliently and swingingly supporting the other end of said spring.

4. In a car truck, a transverse member, a bracket near the center of said transverse member, shock-absorbing means adjacent to the end of said transverse member, a link supported by said car truck, a resilient bearing block supported by said link, and a leaf spring supported at one end by said bracket and at the other end by said link and having its intermediate part engaging said shock-absorbing means.

5. In a car truck, a transverse member having a bracket thereon providing a seat with a hole therein, means swingingly supported by said car truck providing a second seat with a hole therein, a spring member having a plate on each end thereof with lugs engaging said holes, and means on the under side of one end of said transverse member engaging the upper side of the intermediate part of said spring whereby one end of said transverse member is supported by said truck.

In testimony whereof, we affix our signatures.

JOSEPH H. ELLIOTT.
RAGNAR A. NORBOM.